June 8, 1937. G. R. LEWERS 2,083,269
PROCESS FOR THE REACTIVATION OF MINERAL ABSORBENTS
Filed Jan. 15, 1935
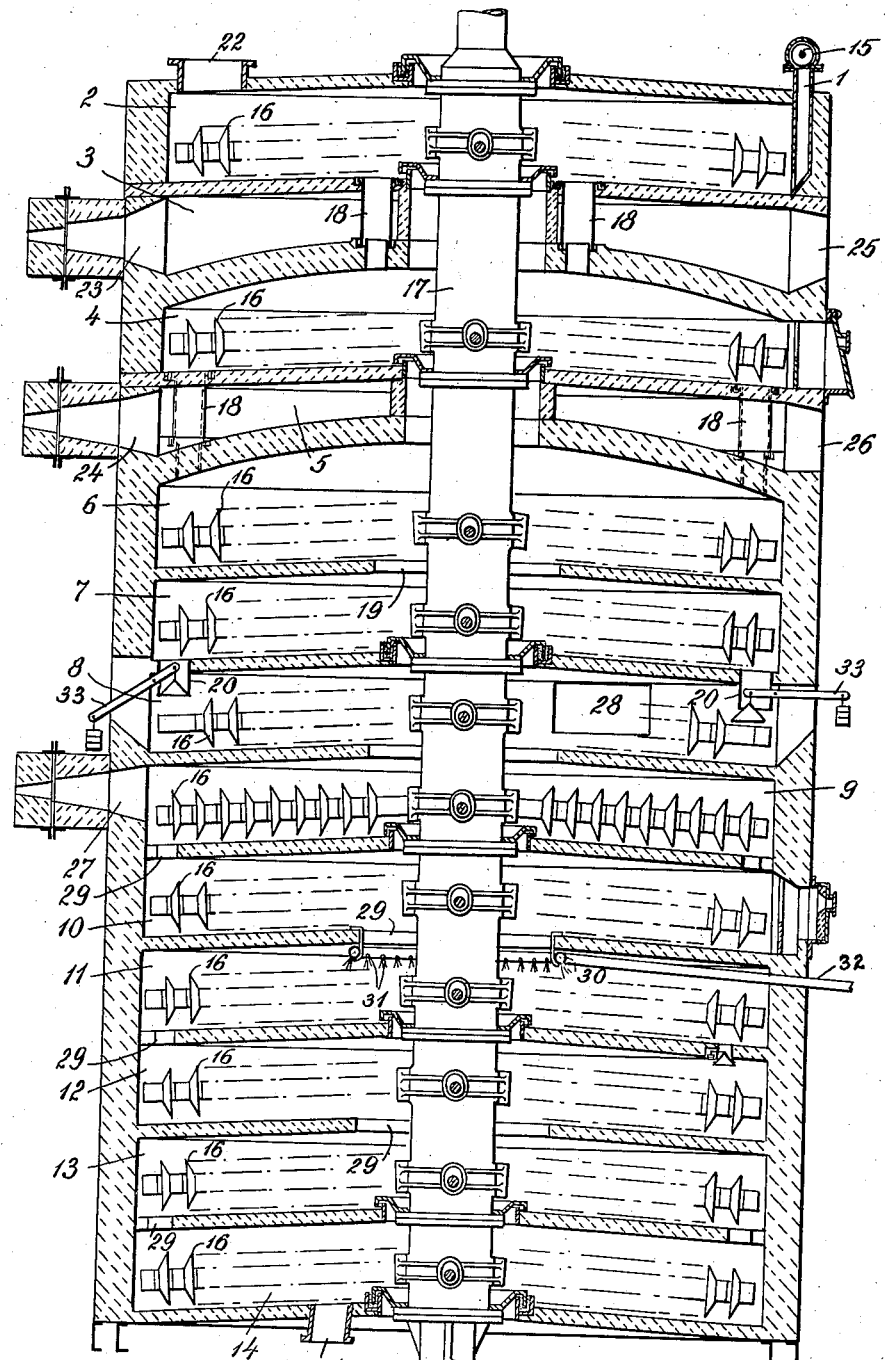
INVENTOR
George R. Lewers
BY
Pennie, Davis, Marvin & Edmonds
ATTORNEYS Patented June 8, 1937

2,083,269

UNITED STATES PATENT OFFICE 2,083,269

PROCESS FOR THE REACTIVATION OF MINERAL ABSORBENTS

George R. Lewers, New York, N. Y., assignor to Decarie Incinerator Corporation, New York, N. Y., a corporation of New York Application January 15, 1935, Serial No. 1,862

2 Claims. (Cl. 252—2)

My invention relates to improvements in the burning or roasting of solids containing vaporizable combustible material, such as oil saturated mineral absorbents and sulfur-bearing ores. My invention is of special value and application in connection with the burning of such mineral absorbents to recover them for re-use. It is also useful in the roasting of such ores, particularly for the elimination of sulfur.

Burning operations to recover oil saturated mineral absorbents such as fuller's earth, clays and like materials, to recover them for re-use are commonly carried out in tiered multiple hearth furnaces provided with rotary rabbles driven from a common shaft extending vertically through the several hearths, the oil saturated absorbent being supplied to the uppermost hearth, the oil content of the absorbent being utilized as fuel for the operation and the burned product being discharged from the lowermost hearth. As discharged from such burning operations the absorbent, due to its high temperature, presents a considerable explosion hazard. Further, the burned product in its highly heated condition is difficult to handle and apparatus such as belt conveyors used for handling the burned product is soon destroyed.

According to my invention these difficulties are avoided or minimized by cooling the absorbent undergoing treatment prior to its discharge from the furnace. The cooling of the absorbent effects a reduction in its temperature as discharged from the furnace and minimizes the explosion hazard. Again, the absorbent in its cooled condition may be readily handled and is at a temperature below that where any injury to the conveying apparatus takes place. By the use of my invention the capacity of the furnace is increased and the necessity for auxiliary cooling equipment eliminated. Further, in accordance with my invention the advantages of cooling the absorbent are obtained without injury to the absorbent being burned or roasted.

In burning operations conducted in tiered multiple hearth furnaces, burning of the absorbent with exothermic reaction occurs primarily in the upper hearths of the furnace. In such operations, once exothermic reaction is complete, further burning of the absorbent is unnecessary and undesirable, and in the usual operation the absorbent passing through the remaining hearths of the furnace is undergoing cooling. My invention provides an improvement in burning operations permitting cooling of the absorbent in a highly advantageous manner prior to its discharge from the furnace. Cooling should not be effected, however, in a hearth where the temperature of the absorbent is below that at which the cooling medium used does not substantially completely vaporize or where the cooling medium, when striking the absorbent, will stop the burning action taking place.

Briefly, my invention relates to the improvement in the furnacing of oil saturated mineral absorbents to recover them for reuse, which comprises cooling the absorbent prior to discharge from the furnace by the introduction of water into direct contact with the absorbent while at a temperature high enough substantially completely to vaporize such introduced water and after exothermic reaction is substantially complete. Advantageously, water should be introduced in proportion cooling the absorbent to a temperature not below that at which such introduced water is completely vaporized. By using water in proportion that it is completely vaporized, no moisture will be present in the burned product as discharged from the furnace and cooling will be effected without injury to the absorbent being burned or roasted.

My invention will be further described in connection with the accompanying drawing which illustrates in a diagrammatic and conventional manner one form of apparatus adapted for carrying out my invention. It is intended and will be understood that this further and more detailed description of particular embodiments of my invention is intended by way of exemplification only and that my invention is not limited to the specific operations described by way of example or to operations carried out in the specific apparatus illustrated. The accompanying drawing is a fragmentary elevation in section with parts broken away of a furnace adapted for carrying out my invention.

The illustrated apparatus comprises a tiered multiple hearth furnace having counterpoised closure means 33 dividing the furnace into an upper part, comprising hearths 2, 4, 6 and 7 and combustion chambers 3 and 5, and a lower part comprising hearths 8, 9, 10, 11, 12, 13 and 14 provided with openings 29 for the passage of material from hearth to hearth. Rabbles 16 connected to shaft 17 are provided for carrying the absorbent across the hearths in its downward passage through the furnace. Outlet connections 21 and 22 are provided for the discharge of absorbent from the furnace and for the discharge of vapors from the upper part of the furnace, respectively. Heat necessary to effect burning of the absorbent in the upper part of the furnace is supplied by combustion of fuel from burners inserted through apertures 23 and 24, the products of combustion being discharged through flues 25 and 26, respectively. Similarly, heat necessary to complete burning of the mineral absorbent is supplied by combustion of fuel from burners inserted through aperture 27, the products of combustion and vapors formed in the lower hearths escaping through stack opening 28. Chutes 20 connect the lowermost hearth in the upper part of the furnace with the topmost hearth in the lower part of the furnace. Again, in the apparatus illustrated the absorbent is supplied through chute 1 to the uppermost hearth 2 by a conventional screw feed mechanism 15. Drop tubes 18 and openings 19 provide passages connecting the distillation hearths in the upper part of the furnace. The illustrated apparatus is more completely described in my co-pending application Serial No. 758,911, filed December 24, 1934.

In carrying out my invention in the illustrated apparatus, the absorbent is subjected to burning and after exothermic reaction is substantially complete, subjected to cooling in hearth 11 by direct contact with water. According to my invention cooling of the absorbent should not take place until exothermic reaction is substantially complete. In the event exothermic reaction is not substantially complete by the time the absorbent has reached hearth 11, water, for cooling, may be introduced in some lower hearth such as hearth 12, for example. Again, in carrying out my invention, water should not be introduced into a hearth in direct contact with the absorbent where the temperature is below that at which the water introduced will not substantially completely vaporize or where the water, when striking the absorbent, will stop the burning action taking place. It should be noted that some cooling of the absorbent will occur in hearths below the hearth in which water is introduced, but this cooling does not take place in direct contact with water.

In the apparatus illustrated nozzles 30, having jets 31 connected to a source of water supply, are shown positioned in hearth 11 for the introduction of water into direct contact with the absorbent. As above indicated, water should not be introduced in contact with the absorbent until exothermic reaction is substantially complete, and, accordingly, the nozzles for the introduction of water should be positioned in a hearth subsequent to the one in which burning of the absorbent is completed. The nozzles may advantageously be inserted in the hearth immediately following that hearth in which exothermic reaction is substantially complete.

Advantageously the cooling medium should be introduced in proportion cooling the absorbent to a temperature at which the cooling medium is completely vaporized. The cooling medium also advantageously should possess a high cooling action, as thereby the amount of the cooling medium necessary to effect the desired cooling is lessened. Further, the use of such cooling medium is advantageous in that it requires the handling of smaller volumes and permits the use of correspondingly smaller apparatus.

While my invention is advantageously employed in connection with burning operations carried out in a furnace corresponding to that shown in the drawing, it is also useful in connection with burning operations such as those, for example, carried out in conventional tiered multiple hearth furnaces. My invention is useful in connection with burning operations carried out in apparatus such as that described in United States Letters Patent No. 1,881,732, issued to me October 11, 1932, and burning operations carried out in apparatus such as that described in my application Serial No. 758,911, filed December 24, 1934.

In burning operations carried out in tiered multiple hearth furnaces the absorbent, upon completion of exothermic reaction, is in a highly heated condition and in such highly heated condition may cause an explosion in adjacent apparatus containing oil or oil vapors or might ignite a vapor stream and cause considerable damage. By cooling the absorbent prior to its discharge from the furnace by direct contact with water in accordance with my invention, the explosion hazard is minimized, handling is easier and the absorbent is at a temperature at which it is no longer destructive of handling apparatus, and these benefits are obtained without injury to the absorbent being burned or roasted. Further, the capacity of the furnace is increased and the necessity of auxiliary cooling equipment eliminated. By the use of my invention the temperature of the absorbent, as discharged from the furnace, may be 200° F., as compared to 800° F., for example, when cooling is not employed. In this connection it should be noted that while water is introduced into direct contact with the absorbent at a temperature at which it is substantially completely vaporized, some further cooling of the absorbent is effected on those hearths below the hearth in which the water is introduced.

While my invention has been more particularly described in its application to the burning or roasting of oil saturated mineral absorbents to recover them for re-use, it is useful in connection with roasting operations for the desulfurization of ores, of zinc, antimony and lead, for example. In carrying out a burning operation for the desulfurization of an ore in the illustrated apparatus, the sulfur-bearing ore is supplied to the upper part of the furnace and subjected to burning in its downward passage through the furnace and after exothermic reaction is substantially complete subjected to cooling as in hearth 11, for example, by direct contact with water. It should be noted that water should not be introduced into a hearth in direct contact with the ore where the temperature is below that at which the water introduced will not substantially completely vaporize, or where the water, when striking the ore, will stop the burning action taking place. Advantageously, water should be introduced in proportion cooling the ore to a temperature not below that at which such introduced water is completely vaporized. Sulfur vapors driven off from the ore by the burning operation escape through outlet 22 or stack opening 28, depending on what portion of the furnace they are in as freed from the ore. The cooled sulfur-free ore is discharged through outlet 21.

In its cooled condition, as discharged from the furnace, the sulfur-free ore is readily handled and is at a temperature at which it is no longer destructive of handling apparatus. Further, cooling of the ore with water, in accordance with my invention, increases the furnace capacity and eliminates the necessity of auxiliary cooling apparatus.

I claim:

1. The method of revivifying mineral absorbents by furnacing, which comprises heating said absorbents in a zone where they are burned until the resulting exothermic reaction is completed, thereafter and prior to discharge from the furnace bringing water into contact with the absorbents while they are at a temperature substantially above the vaporization point of the water, and the amount of water brought into contact with said absorbents being such that it substantially is completely vaporized by the heat contained in said absorbents, and recovering said absorbents in a substantially dry, cool condition.

2. The method of furnacing solids containing vaporizable, combustible material, which, when burned, undergoes an exothermic reaction, which comprises heating said solids in a zone where they are burned until the exothermic reaction is completed, thereafter and prior to discharge from the furnace bringing water into contact with said solids, the water being brought into contact with said solids while they are at a temperature substantially above the vaporization point of water, and the amount of water brought into contact with said solids being such that it substantially is completely vaporized by the heat contained in said solids, and recovering said solids in a substantially dry, cool condition.

GEORGE R. LEWERS.